(12) United States Patent
Liao

(10) Patent No.: US 8,421,763 B2
(45) Date of Patent: Apr. 16, 2013

(54) ELECTRONIC DEVICE WITH ANTI-SHOCK FUNCTION

(75) Inventor: Ming-Yang Liao, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 614 days.

(21) Appl. No.: 12/632,924

(22) Filed: Dec. 8, 2009

(65) Prior Publication Data

US 2010/0231538 A1    Sep. 16, 2010

(30) Foreign Application Priority Data

Mar. 13, 2009    (CN) .......................... 2009 1 0300865

(51) Int. Cl.
*G06F 3/041* (2006.01)

(52) U.S. Cl.
USPC .......................................... 345/173; 345/174

(58) Field of Classification Search .................. None
See application file for complete search history.

(56) References Cited

U.S. PATENT DOCUMENTS

| | | | | |
|---|---|---|---|---|
| 5,835,298 A * | 11/1998 | Edgerton et al. | ................. | 360/75 |
| 6,970,277 B1 * | 11/2005 | Makishima | ................... | 359/238 |
| 7,042,663 B2 * | 5/2006 | Shimotono et al. | ............. | 360/31 |
| 7,059,182 B1 * | 6/2006 | Ragner | .......................... | 73/200 |
| 7,191,089 B2 * | 3/2007 | Clifford et al. | ................ | 702/141 |
| 7,243,530 B2 * | 7/2007 | Takeda et al. | ................ | 73/65.01 |
| 7,578,184 B2 * | 8/2009 | Fontanella et al. | ............. | 73/488 |
| 7,751,142 B2 * | 7/2010 | Karakas | .......................... | 360/75 |
| 8,061,182 B2 * | 11/2011 | Weber et al. | ................. | 73/12.06 |
| 8,245,573 B2 * | 8/2012 | Lammel | .......................... | 73/386 |
| 2003/0085870 A1 * | 5/2003 | Hinckley | ....................... | 345/156 |
| 2004/0240098 A1 * | 12/2004 | Ito et al. | .......................... | 360/75 |
| 2005/0212751 A1 * | 9/2005 | Marvit et al. | ................. | 345/156 |
| 2006/0070439 A1 * | 4/2006 | Kwon et al. | .................... | 73/488 |
| 2006/0071912 A1 * | 4/2006 | Hill et al. | ....................... | 345/173 |
| 2006/0279548 A1 * | 12/2006 | Geaghan | ........................ | 345/173 |
| 2007/0156364 A1 * | 7/2007 | Rothkopf | ....................... | 702/117 |
| 2008/0001607 A1 * | 1/2008 | Horiguchi et al. | ............ | 324/600 |
| 2008/0183313 A1 * | 7/2008 | Lundquist | ........................ | 700/84 |
| 2008/0238884 A1 * | 10/2008 | Harish | .......................... | 345/174 |
| 2009/0262074 A1 * | 10/2009 | Nasiri et al. | .................. | 345/158 |
| 2010/0062833 A1 * | 3/2010 | Mattice et al. | .................. | 463/24 |
| 2010/0177057 A1 * | 7/2010 | Flint et al. | ...................... | 345/174 |

* cited by examiner

*Primary Examiner* — Dismery Mercedes
(74) *Attorney, Agent, or Firm* — Altis Law Group, Inc.

(57) ABSTRACT

An electronic device with anti-shock function includes a shell, a sensor, and a controller received in the shell and electrically coupled to the sensor. The sensor includes at least one pressure sensor to generate a position signal and at least one touch sensor to generate a touch signal. The controller defines the electronic device to be in a freefall state and enters into a protection mode when the controller does not receive the position signal and the touch signal.

20 Claims, 7 Drawing Sheets

ELECTRONIC DEVICE WITH ANTI-SHOCK FUNCTION

BACKGROUND

1. Technical Field

The present disclosure relates to an electronic device with an anti-shock function.

2. Description of Related Art

At present, portable electronic devices such as notebook computers, portable multimedia players, card digital cameras, or mobile phones are widely used. However, damage may be caused to these portable electronic devices when they are accidentally dropped. These damages may cause exterior damage to the devices or internal damage to the devices, including irreversible damage to a circuit board of an electronic device.

It is thus desirable to provide an electronic device which can overcome the described limitation.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will now be made to the drawings to describe various inventive embodiments of the present disclosure in detail, wherein like numerals refer to like elements throughout.

Figure 1:
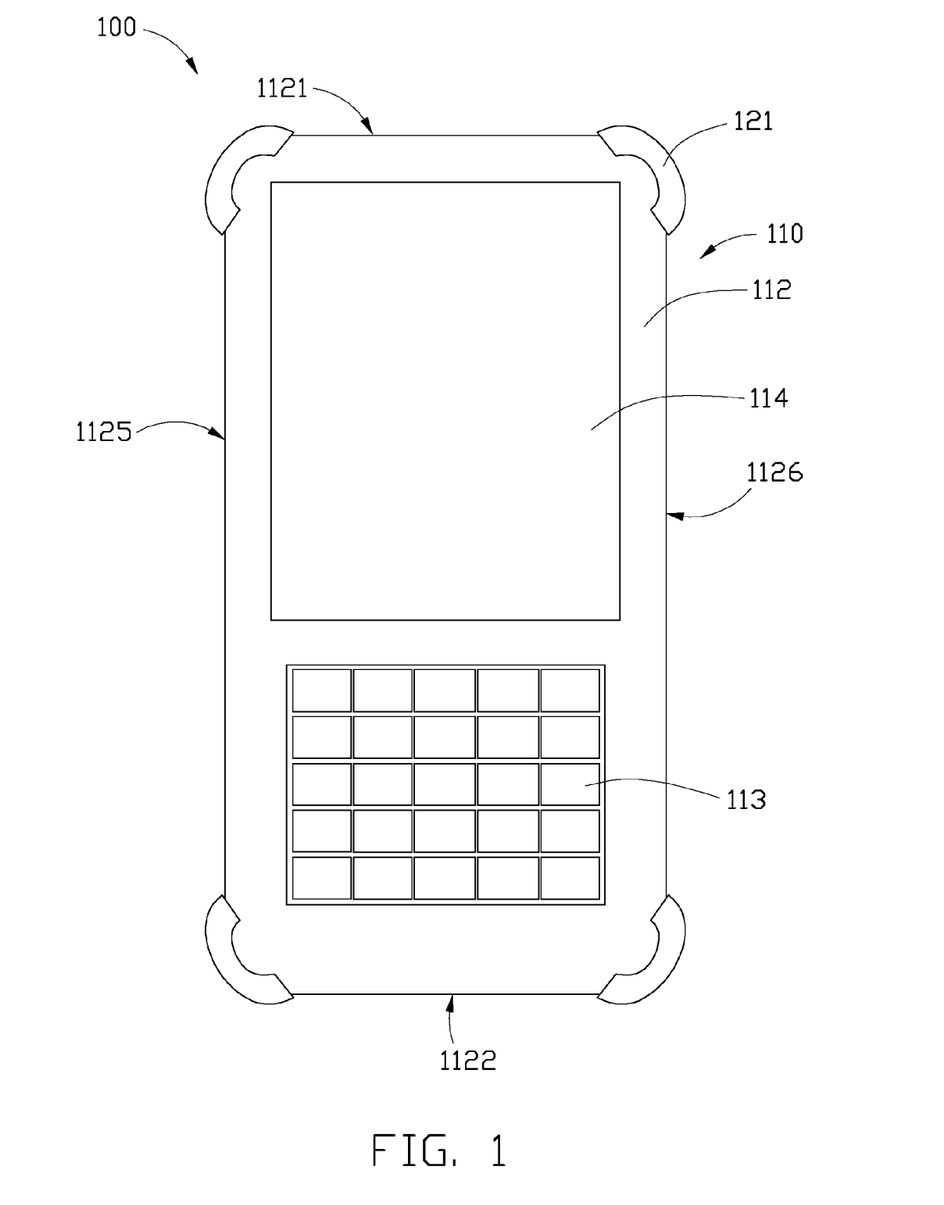
FIG. 1 is schematic, top view of an electronic device with anti-shock function according to a first exemplary embodiment.
Figure 2:
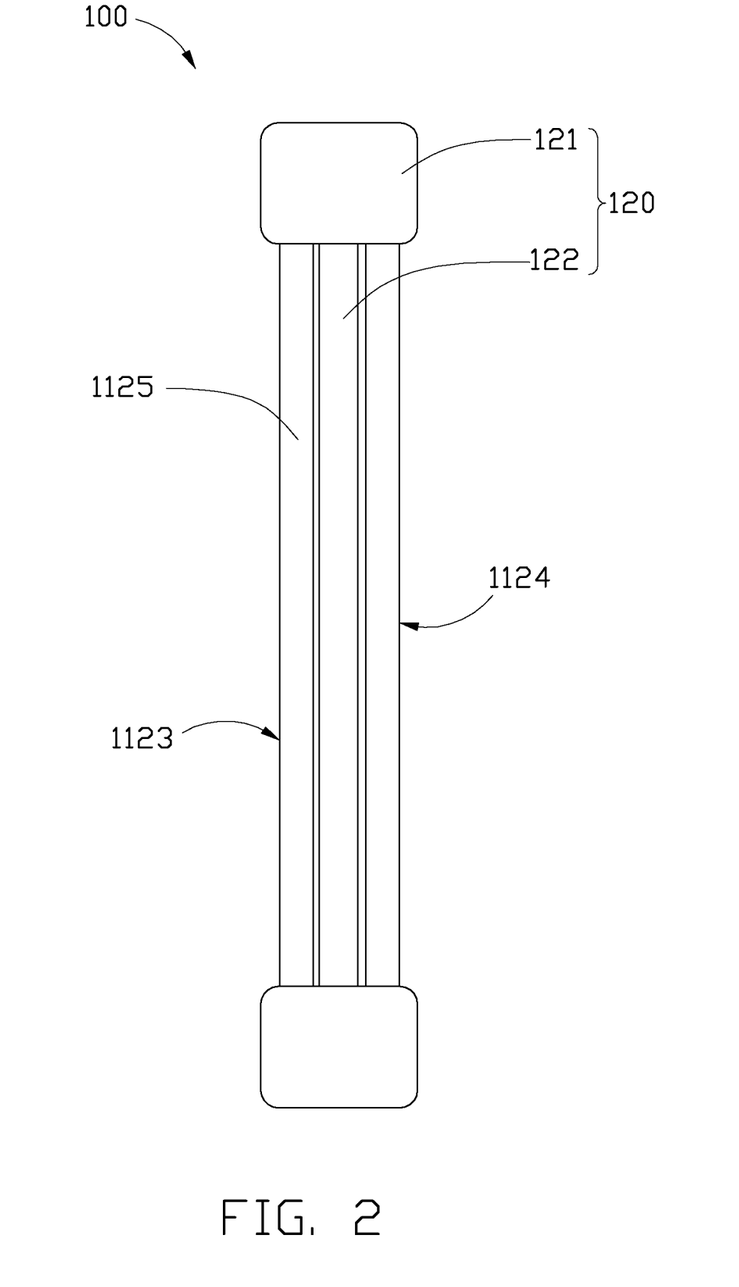
FIG. 2 is schematic, side view of the electronic device of FIG. 1.
Figure 3:
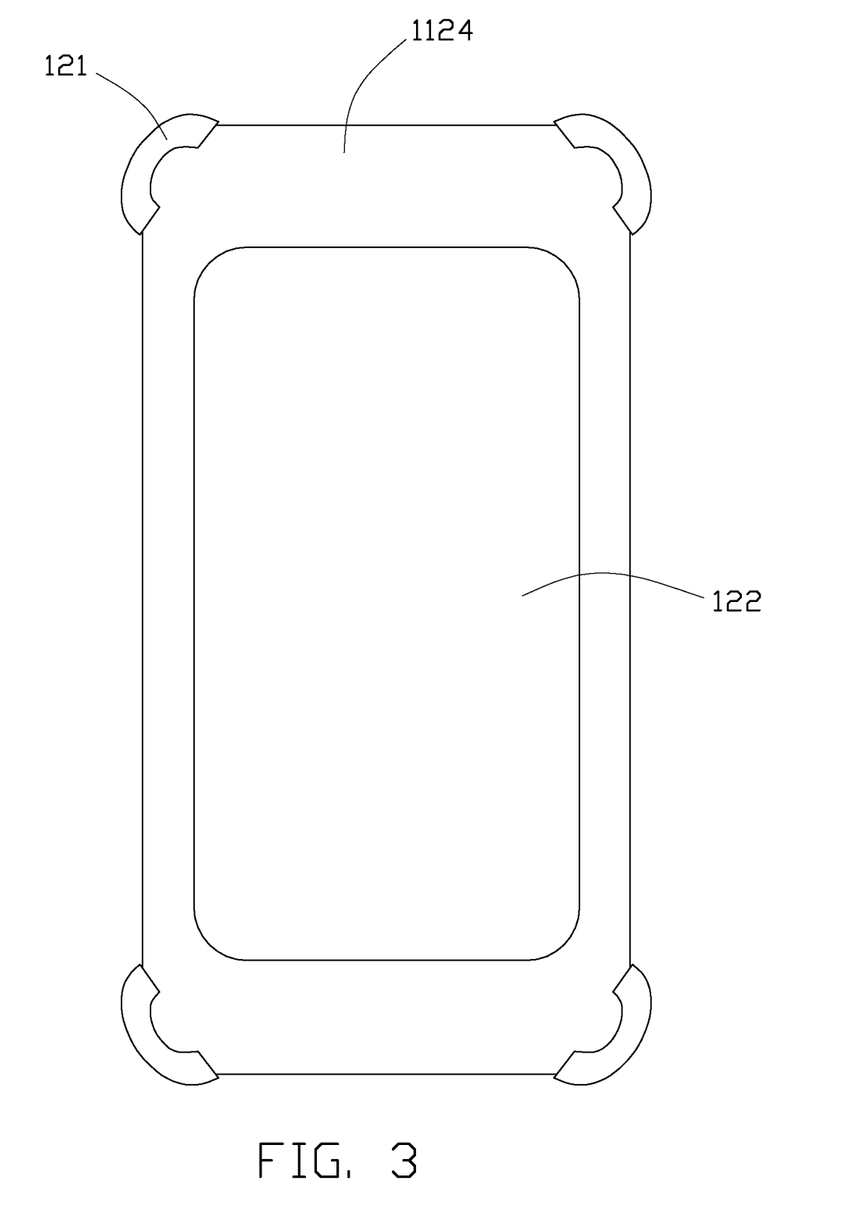
FIG. 3 is schematic, bottom view of the electronic device of FIG. 1.

Referring to FIG. 1-FIG. 3, an electronic device 100 with an anti-shock function according to a first exemplary embodiment includes a body 110 and a sensor 120. The electronic device 100 can be a notebook computer, a portable multimedia player, a digital camera, or a mobile phone, for example, but the disclosure is not limited thereto.

The body 110 of the electronic device 100 includes a controller 111, a shell 112, a keypad 113, a screen 114, and a driving circuit (not shown). The controller 111 and the driving circuit are accommodated in the shell 112 for protection. In the illustrated embodiment, the shell 112 is rectangular and includes a first side wall 1121, a second side wall 1122, a third side wall 1125, a fourth side wall 1126, an operation surface 1123, and a supporting surface 1124. The first side wall 1121 and the second side wall 1122 are opposite to each other. The third side wall 1125 and the fourth side wall 1126 are opposite to each other. An area of any one of the operation surface 1123 and the supporting surface 1124 is larger than that of any of one of the first, second, third, and fourth side walls 1121, 1122, 1125, 1126. An area of any one of the third and the fourth side walls 1125, 1126 is larger than that of any of one of the first and the second side walls 1121, 1122.

The screen 114 is partially received in the shell 112 and exposed from a first rectangular window defined in upper part of the operation surface 124. The keypad 113 is attached to a lower part of the operation surface 124 and electrically coupled to the controller 111. The keypad 113 is used to receive user inputs. The screen 114 is used to display graphical data.

The sensor 120 is positioned on the outer surface of the shell 112 and includes at least one pressure sensor 121 to sense a weight of the electronic device 100 to generate a position signal and at least one touch sensor 122 to sense a touch to the electronic device 100 to generate a touch signal. The controller 111 is electrically coupled to the sensor 120 to receive the position signal and the touch signal and configured to define operation states of the electronic device 100 according to the position signal and the touch signal.

In the illustrated embodiment, the at least one pressure sensor 121 includes four pressure sensors 121. The four pressure sensors 121 are located at four corners of the shell 112 at the intersections of the first, second, third, fourth side walls 1121, 1122, 1125, 1126 correspondingly. Each pressure sensor 121 extends perpendicularly over the operation surface 1123 a first distance and over the supporting surface 1124 a second distance to form a first sensing surface and a second sensing surface respectively. At least one of the pressure sensors 121 can generate a position signal by weight of the electronic device 100 when the electronic device 100 is at rest such as on a desk, a table, a platform, or other supporting surface. The controller 111 defines the electronic device 100 to be in a rest state when the controller 111 receives at least one position signal and defines the electronic device 100 to be in a moving state when the controller 111 does not receive a position signal.

The at least one touch sensor 122 includes three touch sensors 122 located on the third side wall 1125, the fourth side wall 1126 and the supporting surface 1124 correspondingly. In the illustrated embodiment, three touch sensors 122 are attached to the third side wall 1125, the fourth side wall 1126 and the supporting surface 1124, correspondingly. The second sensing surface of each pressure sensor 121 is farther than a touch surface of the touch sensor 122 attached to the supporting surface 1124 relative to the supporting surface 1124. Each touch sensor 122 extends from the first side wall 1121 to the second side wall 1122. At least one of the touch sensors 122 can generate a touch signal when the electronic device 100 is touched. The controller 111 defines the electronic device 100 to be in a handheld state when the controller 111 receives at least one touch signal and defines the electronic device 100 to be in a handsfree state when the controller 111 does not receives a touch signal. In the illustrated embodiment, the touch sensors 122 may be resistive touch sensors or a capacitive touch sensors.

Figure 4:
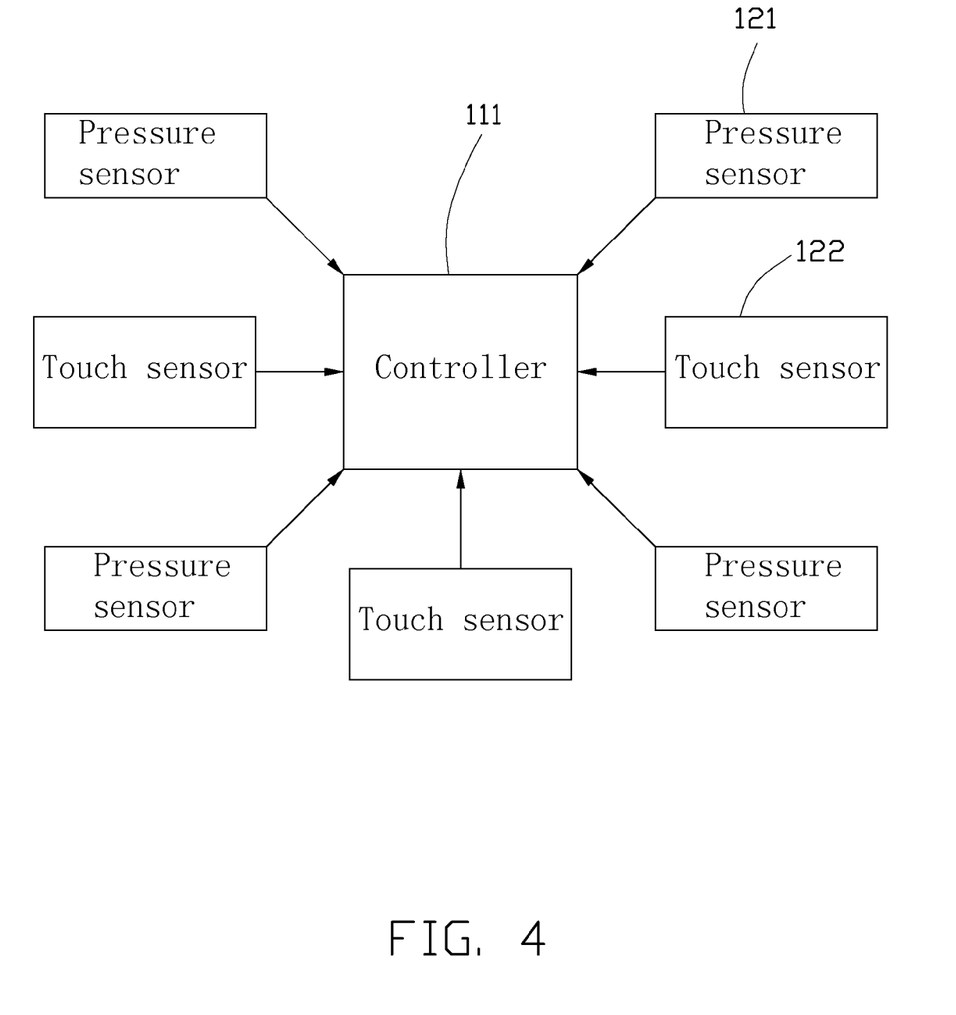
FIG. 4 is a block diagram of a circuit of the electronic device of FIG. 1.

When the controller 11 does not receive both the touch signal and position signal, the controller 111 defines the electronic device 100 to be in a freefall state and enters into a protection mode to shut down the electronic device 100 or terminate/halt predetermined important operation procedures. For example, the controller 111 can stop data being transferred with a storage device of the electronic device 100 such as a memory card, or a hard disk when the protection mode is entered.

In an alternative embodiment, the at least one touch sensor 122 extends to cover the third side wall 1125, the supporting surface 1124, and the fourth side wall 1126 in the order.

In another alternative embodiment, the three touch sensors 122 can be partially embedded in the third side wall 1125, the fourth side wall 1126 and the supporting surface 1124, correspondingly. Thus, exposed touch surfaces of the three touch sensors 122 are lies on the same plane as the third side wall 1125, the fourth side wall 1126 and the supporting surface 1124, correspondingly.

Figure 5:
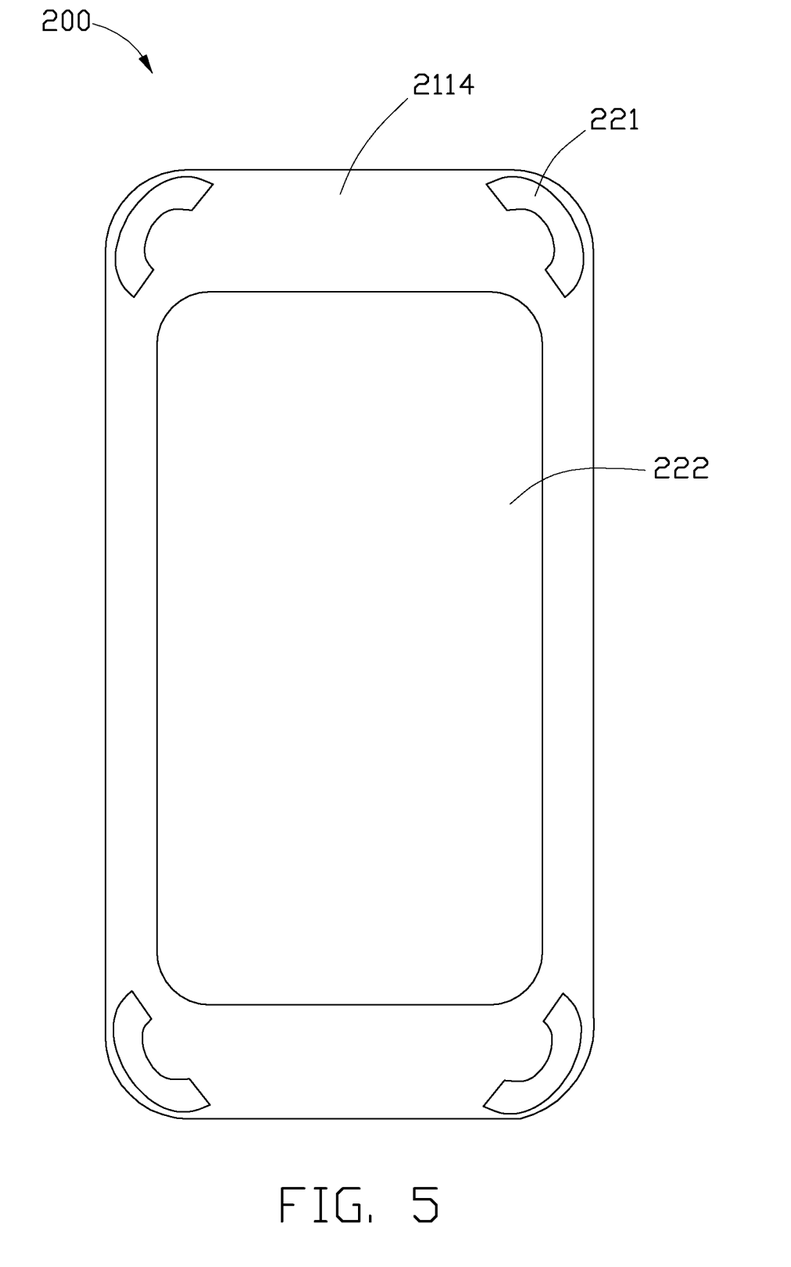
FIG. 5 is schematic, top view of an electronic device with anti-shock function according to a second exemplary embodiment.
Figure 6:
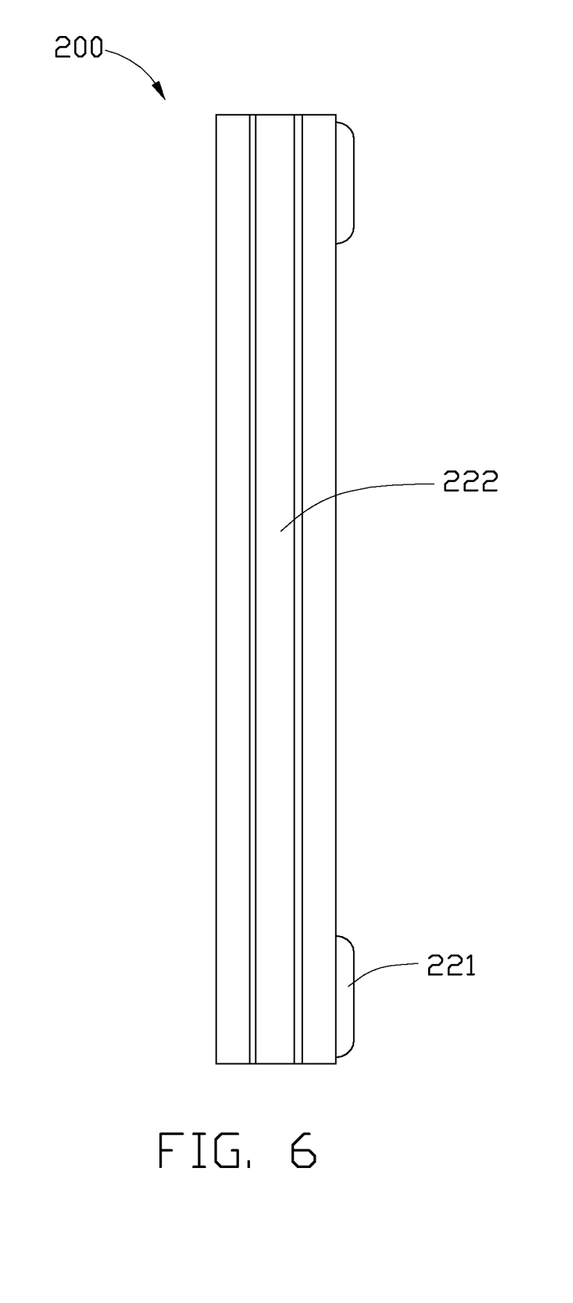
FIG. 6 is schematic, side view of the electronic device of FIG. 5.

Referring to FIG. 5 and FIG. 6, an electronic device with an anti-shock function according to a second exemplary embodiment is shown. The electronic device 200 is similar to the electronic device 100 except that four pressure sensors 221 are positioned on a supporting surface 2114 near four corners, correspondingly. Each pressure sensor 221 protrudes from the supporting surface 2114 to form a first sensing surface farther than a touch surface of a touch sensor 222 attached to the supporting surface 2114.

Figure 7:
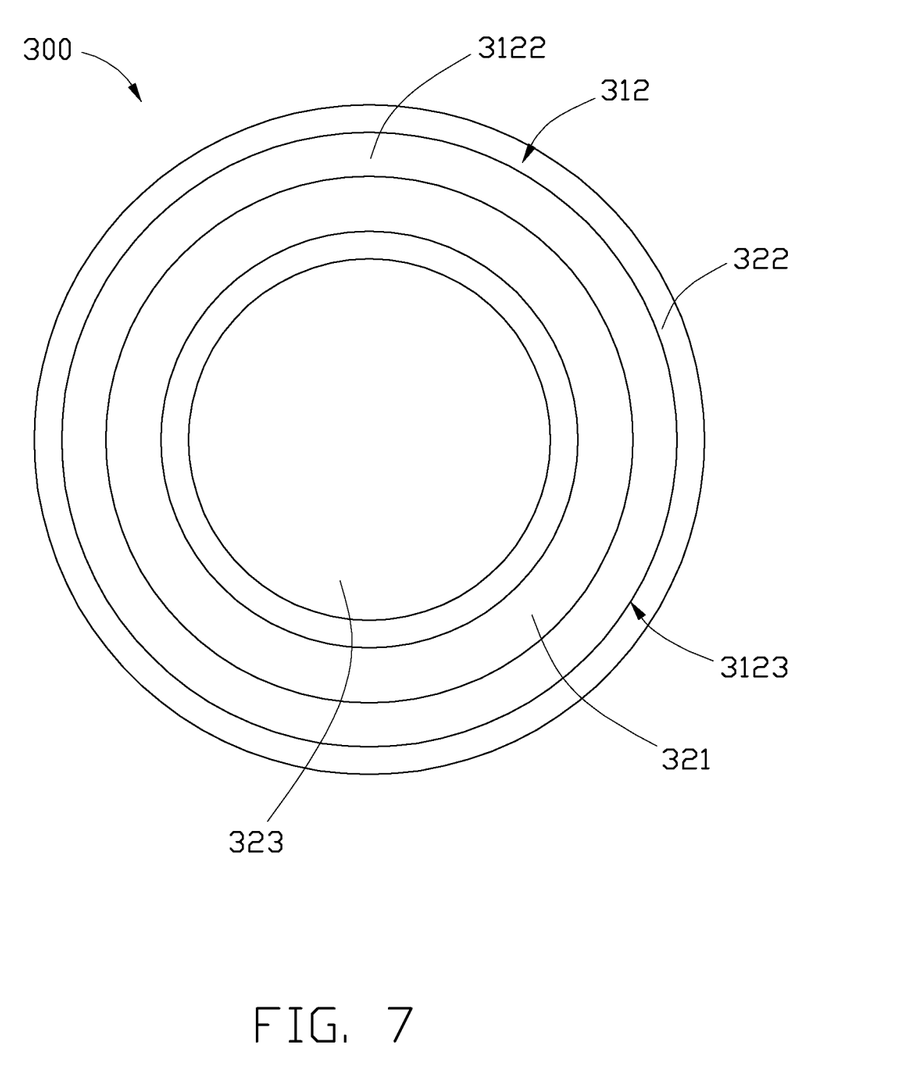
FIG. 7 is schematic, top view of an electronic device with anti-shock function according to a third exemplary embodiment.

Referring to FIG. 7, an electronic device with an anti-shock function according to a third exemplary embodiment is shown. The electronic device 300 includes a cylinder having a circular operation surface (not shown), a circular supporting surface 3122 opposite to the operation surface, and a cylindrical side surface 3123 sandwiched between the operation surface and the supporting surface 3122. The electronic device 300 further includes one pressure sensor 321 positioned on the supporting surface 3112 and a first touch sensor 322 and a second touch sensor 323 positioned on the cylindrical side surface 3123 and the supporting surface 3112, correspondingly. The first touch sensor 322 is a cylindrical sheet covering at least part of the cylindrical side surface 3123. The second touch sensor 323 is circular and positioned at the center of the supporting surface 3112. The pressure sensor 321 is circular surrounding the second touch sensor 323 and protrudes perpendicularly from the supporting surface 3122 to form a first sensing surface farther than a touch surface of the second touch sensor 323. Operation of electronic device 300 is similar to the electronic device 100.

It is to be understood, however, that even though numerous characteristics and advantages of certain inventive embodiments have been set out in the foregoing description, together with details of the structures and functions of the embodiments, the disclosure is illustrative only; and that changes may be made in detail, especially in matters of arrangement of parts within the principles of present invention to the full extent indicated by the broad general meaning of the terms in which the appended claims are expressed.

What is claimed is:

1. An electronic device comprising:
a shell;
a sensor, the sensor comprising:
at least one pressure sensor to generate a position signal using a weight of the electronic device when the electronic device is at rest;
at least one touch sensor to generate a touch signal when the electronic device is held by a user,
a controller received in the shell and electrically coupled to the sensor, wherein the controller determines the electronic device to be in a freefall state and enters a protection mode when the controller does not receive the position signal and the touch signal.

2. The electronic device of claim 1, wherein the controller shuts down the electronic device or terminates one or more operation procedures of the electronic device when the controller enters the protection mode.

3. The electronic device of claim 1, wherein the controller defines the electronic device to be in a rest state when the controller receives the position signal.

4. The electronic device of claim 1, wherein the controller defines the electronic device to be in a moving state when the controller does not receive the position signal.

5. The electronic device of claim 1, wherein the at least one touch sensor generates the touch signal when the touch sensor of the electronic device is touched.

6. The electronic device of claim 1, wherein the controller defines the electronic device to be in a handheld state when the controller receives the touch signal.

7. The electronic device of claim 1, wherein the controller defines the electronic device to be in a handsfree state when the controller does not receive the touch signal.

8. The electronic device of claim 1, wherein the shell is rectangular and comprises four side walls connected to each other, an operation surface and a supporting surface, wherein the operation surface and the supporting surface are opposite to each other.

9. The electronic device of claim 8, wherein the at least one pressure sensor comprises four pressure sensors, and the four pressure sensors are positioned on the supporting surface near four corners of the supporting surface, correspondingly.

10. The electronic device of claim 9, wherein the four pressure sensors protrudes from the supporting surface to form a first sensing surface farther than a touch surface of one of the three touch sensors located on the supporting surface.

11. The electronic device of claim 9, wherein the at least one touch sensor comprises three touch sensors located on two opposite side walls and the supporting surface, correspondingly, the touch sensors located on two opposite side walls extend from one pressure sensor to another pressure sensor, the touch sensor located on the supporting surface almost cover the supporting surface.

12. The electronic device of claim 8, wherein the at least one pressure sensor comprises four pressure sensors, and the four pressure sensors are located at four corners of the shell at the intersections of the four side walls.

13. The electronic device of claim 12, wherein each one of the four pressure sensors extends perpendicularly over the operation surface a first distance to form a first sensing surface.

14. The electronic device of claim 13, wherein each one of the four pressure sensors extends perpendicularly over the supporting surface a second distance to form a second sensing surface.

15. The electronic device of claim 14, wherein the second sensing surface formed by the four pressure sensors is farther than a touch surface of one of the three touch sensors located on the supporting surface.

16. The electronic device of claim 1, wherein the shell is a cylinder and comprises a circular operation surface, a circular supporting surface opposite to the operation surface, and a cylindrical side surface sandwiched between the operation surface and the supporting surface.

17. The electronic device of claim 16, wherein the at least one touch sensor comprises a first touch sensor covering at least part of the cylindrical side surface and a second touch sensor positioned at the center of the supporting surface, the first touch sensor is a cylinder sheet and the second touch sensor is circular.

18. The electronic device of claim 17, wherein the at least one pressure sensor comprises a circular pressure sensor positioned on the supporting surface surrounding the second touch sensor.

19. The electronic device of claim 18, wherein circular pressure sensor protrudes perpendicularly from the supporting surface to form a sensing surface farther than a touch surface of the second touch sensor positioned at the center of the supporting surface.

20. An electronic device, comprising:
- a rectangular shell comprising four side walls connected to each other, an operation surface adjacent to the four side walls and a supporting surface opposite to the operation surface;
- a sensor comprising:
    - four pressure sensors positioned at four corners of the rectangular shell to support a weight of the electronic device, and to generate a position signal when the electronic device is at rest;
    - at least one touch sensor substantially covering two opposite side walls of the rectangular shell and the supporting surface, the at least one touch sensor generating a touch signal when the electronic device is held by a user,
- a controller received in the shell and electrically coupled to the sensor, wherein the controller determines the electronic device to be in a freefall state and enters a protection mode when the controller does not receive the position signal and the touch signal.

* * * * *